United States Patent [19]

Seki

[11] 4,369,862

[45] Jan. 25, 1983

[54] DISC BRAKE ASSEMBLY FOR VEHICLE USE

[75] Inventor: Masayuki Seki, Tateshina, Japan

[73] Assignee: Nissin Kogyo Kabushiki Kaisha, Kagano, Japan

[21] Appl. No.: 234,758

[22] Filed: Feb. 17, 1981

[30] Foreign Application Priority Data

| Feb. 18, 1980 [JP] | Japan | 55-18666 |
| Feb. 18, 1980 [JP] | Japan | 55-19298[U] |
| Feb. 18, 1980 [JP] | Japan | 55-19300[U] |
| May 1, 1980 [JP] | Japan | 55-60146[U] |

[51] Int. Cl.³ .......................................... F16D 65/02
[52] U.S. Cl. .............................. 188/73.45; 188/73.32
[58] Field of Search ............... 188/18 A, 73.31, 73.32, 188/73.41, 73.44, 73.45, 344

[56] References Cited

U.S. PATENT DOCUMENTS

| 3,552,527 | 1/1971 | Hayes | 188/73.45 |
| 4,022,297 | 5/1977 | Haraikawa | 188/344 X |
| 4,027,749 | 6/1977 | Yamamoto et al. | |
| 4,215,768 | 8/1980 | Seki | 188/73.45 |

FOREIGN PATENT DOCUMENTS

| 52-9770 | 1/1977 | Japan | 188/73.45 |
| 55-47022 | 4/1980 | Japan | 188/73.44 |

*Primary Examiner*—Duane A. Reger
*Attorney, Agent, or Firm*—Posnack, Roberts, Cohen & Spiecens

[57] ABSTRACT

A bracket of simplified, generally rectilinear form carries a pair of slide pins, on which the brake caliper is slidably mounted, at locations substantially aligned with each other radially of the brake disc and on that side of the brake caliper on which the rotating disc leaves the caliper behind. Use of such bracket enables substantial reduction in size and weight of the whole brake assembly. One of the slide pins located relatively close to the axis of the brake disc is removable and an ample working space is obtainable for exchange of the brake pads by swinging the caliper radially outwardly of the disc about the axis of the other slide pin. The brake pads are slidably mounted on a pair of hanger pins removably fitted to the caliper and normally held in place thereon by simple retainer means.

12 Claims, 13 Drawing Figures

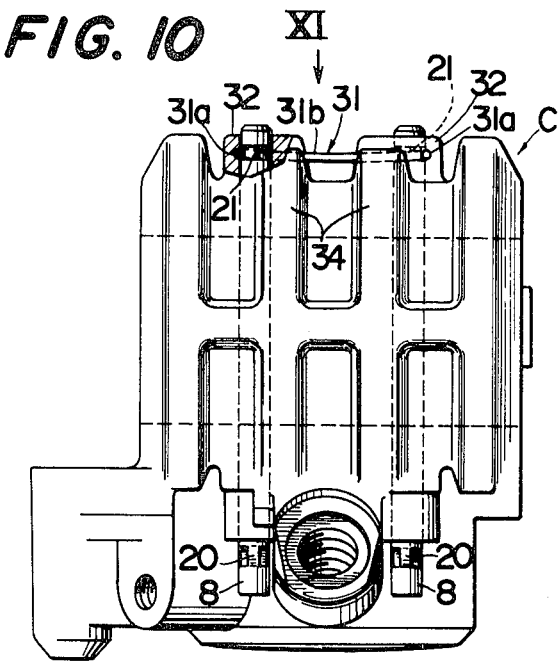
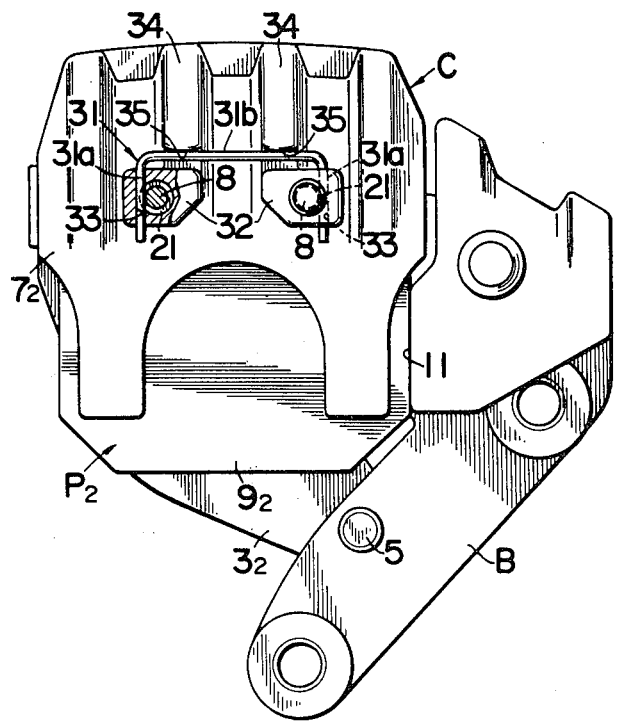
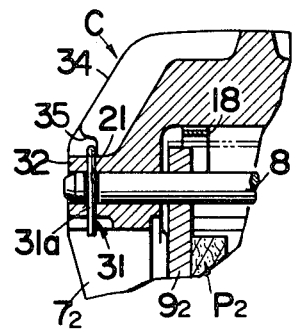

DISC BRAKE ASSEMBLY FOR VEHICLE USE

BACKGROUND OF THE INVENTION

1. Field of the Invention

This invention is concerned with disc brake assemblies for vehicle use and more particularly to those of the type including a brake disc, a bracket fixed to a fixed part of the vehicle in a position adjacent to the brake disc, a first and a second brake pad arranged on the opposite sides of the brake disc, a brake caliper having a first and a second limb formed to straddle the brake pads and provided in the first limb with pressure means for exerting pressure on the back of the first brake pad, and a first and a second slide pin provided on the bracket to connect the brake caliper therewith while allowing the brake caliper to slide in a direction parallel to the axis of rotation of the brake disc.

2. Description of the Prior Art

Previously known in the art is a disc brake assembly of the type concerned which includes a U-shaped bracket having a pair of front and rear support arms adapted to support first and second brake pads at the front and rear ends thereof and a brake caliper connected to the top ends of the two support arms, respectively, by means of a first and a second slide pin. With such disc brake assembly, however, if one of the two support arms of the bracket deflects in a direction away from the other support arm as may occur under brake torque, a substantial lateral pressure must act on both the first and second slide pins as the distance between the axes thereof is changed. This impairs the slidability of the brake caliper and causes undesirable phenomena including unilateral wear and creaking of the brakel pads. In practice, therefore, the bracket is formed thick and rigid enough to withstand the brake torque. Such bracket must have an undesirably large weight and necessarily make the whole brake assembly unduly large in size with the U formation of the bracket designed to embrace the brake pads around the front and rear thereof.

SUMMARY OF THE INVENTION

In view of the above, the present invention is intended particularly to reduce the size and weight of a brake bracket while enabling the distance between the axes of the associated slide pins to remain unchanged even if the bracket deflects under brake torque with the object of obtaining a new and improved disc brake assembly of the type concerned which is compact in size, light in weight and reliable in operation.

Another object of the present invention is to provide a disc brake assembly of the character described in which first and second brake pads are removably hung on a brake caliper and first and second slide pins, on which the brake caliper is slidably mounted, are arranged in spaced apart relation to each other radially of the brake disc thereby to enable the bracket to be simplified in shape so that the brake pads can be readily installed or replaced without being obstructed by the bracket if only the second, radially inner slide pin is removed and the brake caliper swung slightly outward about the axis of the first, radially outer slide pin.

A further object of the present invention is to enable the brake-pad installing and replacing operations to be performed with much improved efficiency by removably mounting on the brake caliper between the two spaced-apart limbs thereof a pair of hanger pins on which the brake pads arranged on the opposite sides of the brake disc are mounted for sliding movement in a direction parallel to the axis of rotation of the brake disc and enabling such hanger pins to be securely held in place on the brake caliper by simple and reliable means.

Yet another object of the present invention is to facilitate the assembling of hydraulic fluid means including a cylinder formed in the brake caliper and a piston slidably fitted in the cylinder to serve the purpose of pressing the adjacent one of the brake pads against the brake disc and particularly to enable the piston to be readily assembled into the cylinder with improved efficiency while at the same time enabling reduction in size of the piston and the brake caliper.

The above and other objects, features and advantages of the present invention will become apparent from the following description of preferred embodiments thereof, reference being had to the accompanying drawings.

BRIEF DESCRIPTION OF THE DRAWINGS

In the drawings

FIG. 1 representing a side view of the disc brake assembly;

FIG. 2, a cross-sectional view taken along line II—II in FIG. 1;

FIG. 3, a cross section taken along line III—III in FIG. 2;

FIG. 4, a fragmentary plan view, partly in section, of the disc brake assembly;

FIG. 5, a cross section taken along line V—V in FIG. 1;

FIG. 6, a front view of the bracket;

FIG. 7, another side view of the disc brake assembly of FIG. 1, looking in the opposite direction;

FIG. 8, an oblique view of the retainer plate;

and FIG. 9, a cross section taken along line IX—IX in FIG. 2;

FIGS. 10 to 12 illustrate a second preferred form of disc brake assembly embodying the present invention;

FIG. 10 representing a partly cutaway plan view showing one of the hanger pins attached to the caliper;

FIG. 11, a view looking in direction of the arrow XI in FIG. 10;

and FIG. 12, a fragmentary side view showing one of the hanger pins fixed to the caliper by retaining clip means.

DESCRIPTION OF THE PREFERRED EMBODIMENTS

Description will first be made with reference to FIGS. 1 to 9, which illustrate a disc brake assembly for use on a two-wheeled motorcycle.

Figure 1:
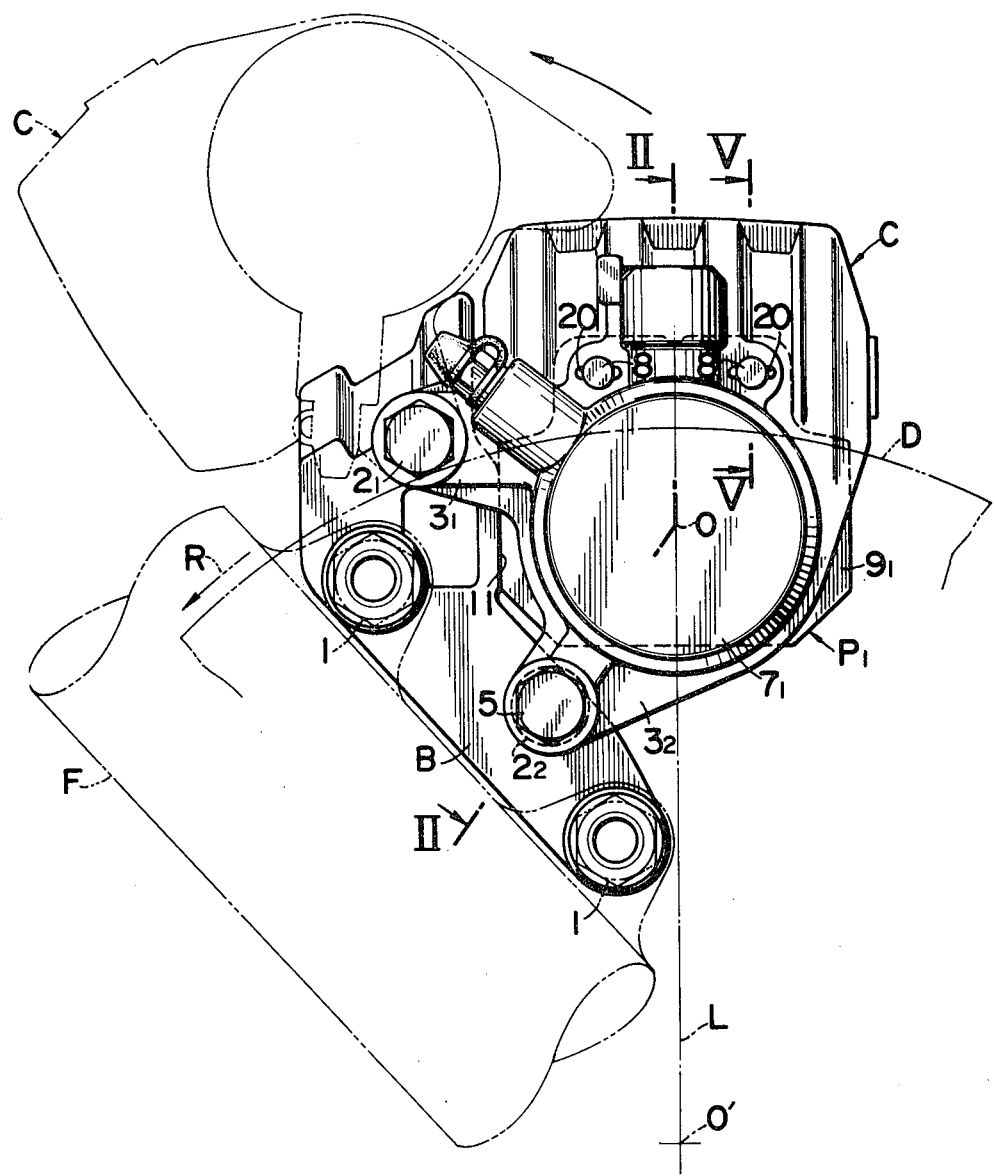
FIGS. 1 to 9 illustrate a preferred form of disc brake assembly embodying the present invention.

In FIG. 1, reference character D indicates a brake disc which is rotatable in the direction of the arrow R together with the front wheel (not shown) of the motorcycle during forward travel thereof. A bracket B is arranged adjacent to the brake disc D on one side thereof and is shaped at the top in the form of inverted U so as to straddle the brake disc D (see FIG. 6). Also, the bracket B is firmly secured to a fixed part of the vehicle, for example, to the front fork F, by fastening bolts 1.

A brake caliper C is connected to the bracket B by means of a pair of first and second slide pins $2_1$ and $2_2$, which are arranged in parallel to the axis of rotation of the brake disc D. As observed, the bracket B lies wholly on the forward side of brake caliper C with respect to the direction of rotation of the brake disc D, that is, on that side of brake caliper C on which the brake disc D in rotation leaves the caliper behind.

Figure 2:
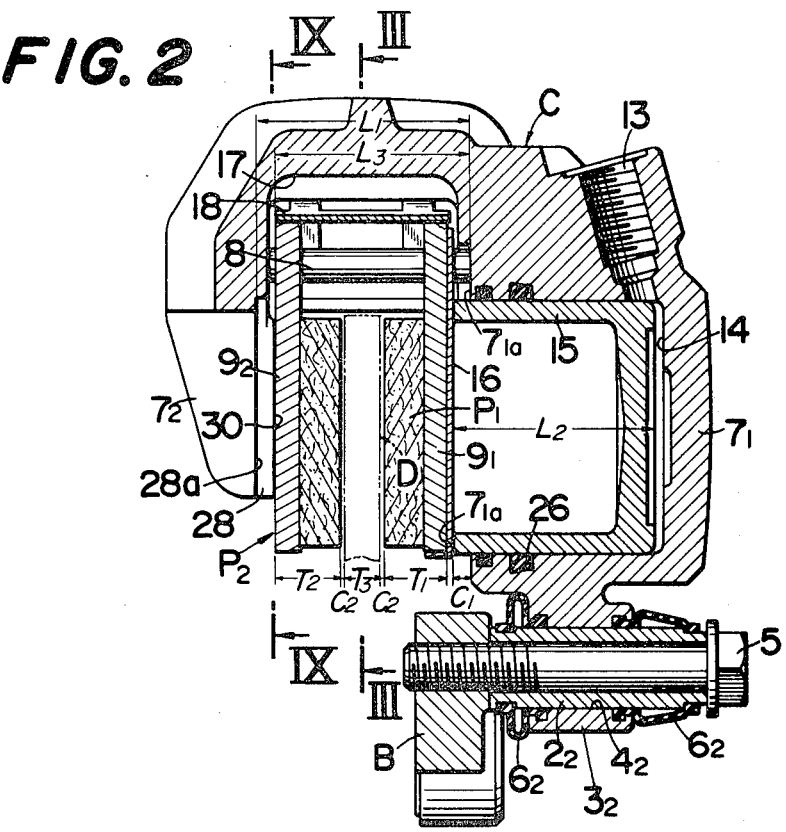
Figure 4:
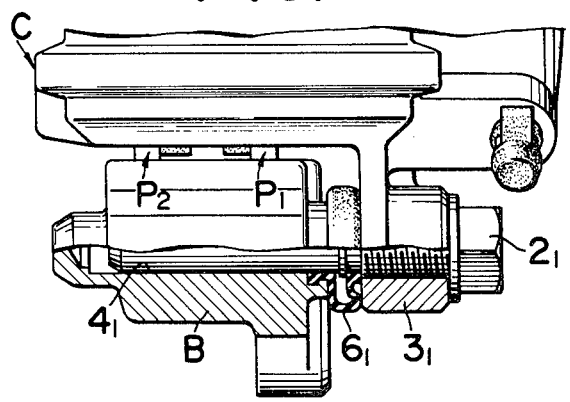

The first slide pin $2_1$ is shaped at one end as a headed threaded bolt, as shown in FIG. 4, and is screwed into the upper lug $3_1$ of a pair of vertically spaced lugs $3_1$ and $3_2$ formed on the caliper C at a location radially outside of the rotary disc D (FIG. 1) and is slidably fitted in a support hole 4, formed in the bracket B at the top end thereof. To protect the sliding surface of the slide pin $2_1$, a rubber boot $6_1$ is fitted in compression between the adjacent faces of the bracket B and the lug $3_1$ (FIG. 4). On the other hand, the second slide pin $2_2$ is of hollow cylindrical form and is removably secured to the bracket B on one side thereof and at a location radially inside of the rotary disc D by means of a threaded bolt 5, as shown in FIGS. 1 and 2. $2_1$ is slidably fitted in a support hole $4_2$ formed in the lower lug $3_2$ of caliper C. To protect the sliding surface of the slide pin $2_2$, rubber boots $6_2$ and $6_3$ are arranged between the lug $3_2$ and the slide pin $2_2$ at the respective ends of the latter. As observed in FIG. 1, the two slide pins $2_1$ and $2_2$ are substantially aligned with each other radially of the rotary disc D and arranged on that side of a plane L containing the central axis O of an oil-hydraulic cylinder 14 formed in the brake caliper C (which will be described later in detail) and the axis of rotation O' of brake disc D which is forward with respect to the direction of rotation of the brake disc D and on which side the caliper C is fixed to the vehicle.

Referring to FIG. 2, the brake caliper C has a first and a second limb $7_1$ and $7_2$ formed to straddle a pair of first and second brake pads $P_1$ and $P_2$, which are arranged, respectively, on the left and right sides of brake disc D. Removably fitted to the brake caliper C are a pair of front and rear, spaced parallel hanger pins 8 which extend between the two caliper limbs $7_1$ and $7_2$ in parallel to the axis of rotation of brake disc D and on which the braking plates $9_1$ and $9_2$ of brake pads $P_1$ and $P_2$ are slidably mounted to be suspended therefrom.

Figure 5:
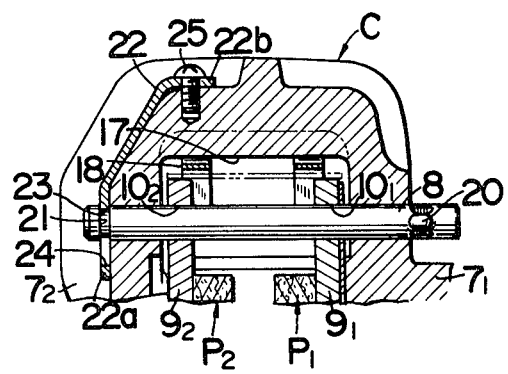
Figure 6:
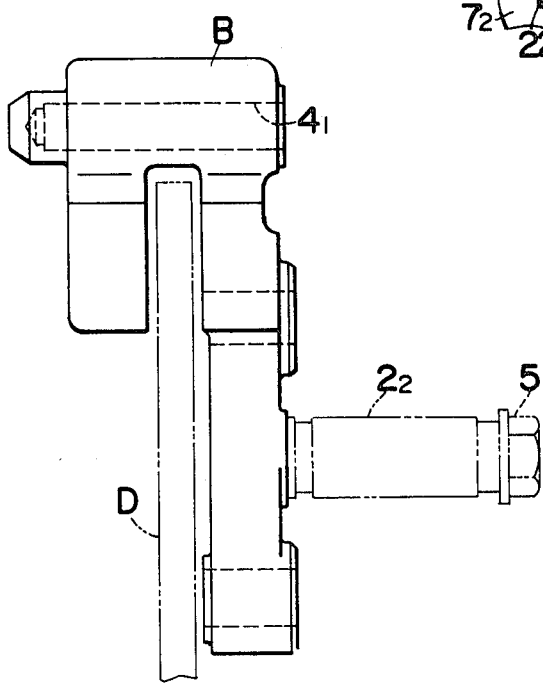

Retainer means for holding the hanger pins 8 in place on the brake caliper C will next be described with reference to FIGS. 1, 5, 7 and 8. Referring first to FIGS. 1 and 5, the hanger pins 8 are each formed at one end with a pair of laterally extending positioning projections 20 and at the other end around the periphery thereof with a circumferential groove 21. As observed, the positioning projections 20 are held in abutting engagement with the outside surface of the first limb $7_1$ of brake caliper C to determine the axial position of the hanger pin 8 relative to the caliper, in which pin position the circumferential groove 21 is exposed outside of the second caliper limb $7_2$. A single retainer plate 22 is brought into engagement with the circumferential grooves 21 in the paired hanger pins 8 in the manner described below.

Figure 7:
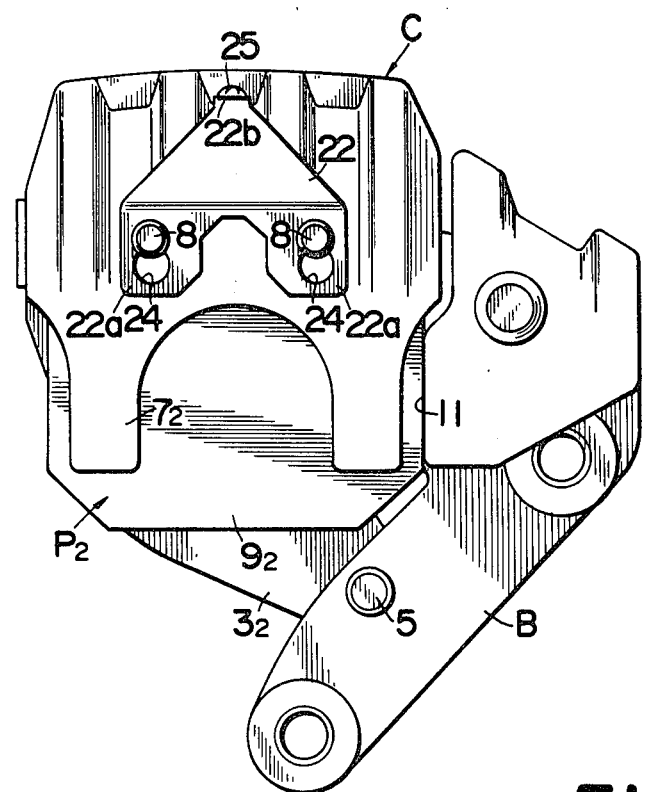
Figure 8:
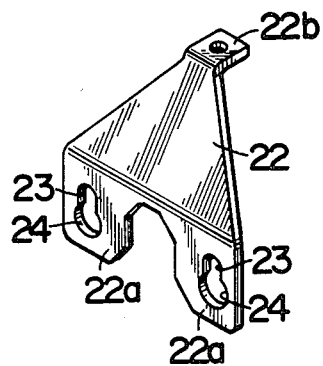

As clearly seen in FIGS. 7 and 8, the retainer plate 22 is formed at one end with a pair of spaced apart detent lugs 22a and at the other end with an anchoring lug 22b which extends along the median line of the retainer plate and substantially at right angles to the plane containing the detent lugs 22a. Formed in each of the detent lugs 22a are an elongate slot 23 and an enlarged-diameter circular aperture 24 communicating with the elongate slot 23 at that end of the latter which is remote from the anchoring lug 22b. The elongate slot 23 and circular aperture 24 together form a keyhole-like locking aperture, as seen in FIG. 8. It is to be noted that the elongate slots 23 as well as the circular apertures 24, formed in the paired detent lugs 22a, are spaced apart from each other by a distance equal to that between the axes of the hanger pins 8 fitted to the brake caliper C and the elongate slots 23 are sized for fitting engagement with the respective circumferential grooves 21 formed in the hanger pins 8, the circular apertures 24 being formed to allow passage of the respective hanger pins 8 therethrough. In assembling, the retainer plate 22 is first brought to the caliper limb $7_2$ so that the adjacent end portions of hanger pins 8 extending beyond the outside surface of the caliper limb $7_2$ are inserted into the enlarged-diameter portions 24 of the locking apertures in the detent lugs 22a and then is pushed downwardly until the anchoring lug 22b is laid on the roof or top surface of the bridge section of brake caliper C, causing the side edges of elongate slots 23 to slide into the respective circumferential grooves 21 in the hanger pins 8. The anchoring lug 22b is thereupon firmly secured to the roof of brake caliper C by screw means 25. The two hanger pins 8 are now securely held in place against axial movement by the retainer plate 22 with its detent lugs 22a engaging in the respective circumferential grooves 21 formed in the hanger pins 8.

Figure 3:
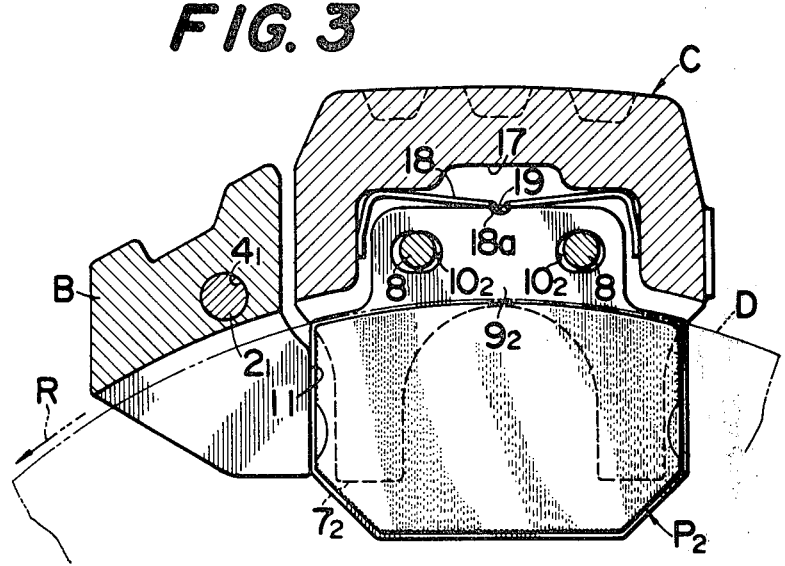

The backing plates $9_1$ and $9_2$ of brake pads $P_1$ and $P_2$ are each formed adjacent to the top edge thereof with a pair of through apertures $10_1$ or $10_2$ through which the two hanger pins 8 are inserted (see FIG. 5) laterally elongated to allow the brake pad $P_1$ or $P_2$ to move in the circumferential direction of brake disc D within a limited range so that the forward side edges of backing plates $9_1$ and $9_2$ with respect to the direction of rotation of brake disc D are brought into abutting engagement with a torque-bearing surface 11 formed on the bracket B upon brake application (see FIGS. 1, 3 and 7).

As clearly seen in FIG. 2, the first limb $7_1$ of brake caliper C is formed therein with a pressure oil inlet port 13, which is connected with a known form of brake master cylinder (not shown), and an oil-hydraulic cylinder 14 communicating with the oil inlet port 13. Slidably fitted in the cylinder 14 is a piston 15 which is pressed against the backing plate $9_1$ of first brake pad $P_1$ upon energization of the hydraulic cylinder. Reference numeral 16 indicates an antivibration shim interposed between the backing plate $9_1$ and piston 15. The second limb $7_2$ of caliper C is engageable with the backing plate $9_2$ of second brake pad $P_2$.

Figure 9:
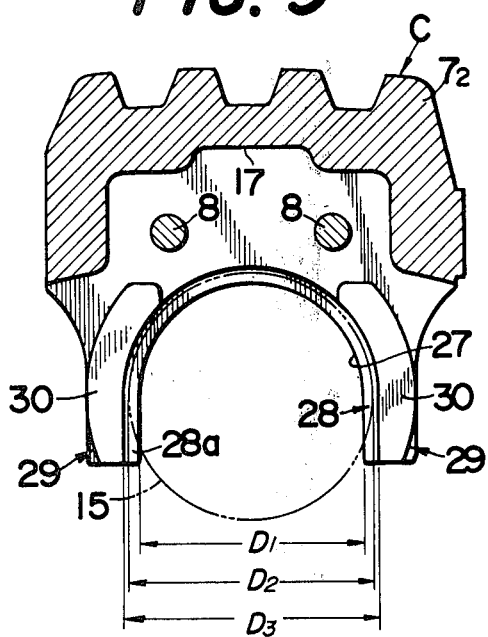

Referring to FIG. 9, the second limb $7_2$ of brake caliper C is formed with a downwardly open substantially semicircular notch 27 and a substantially semicircular recess 28 formed along the peripheral edge of the notch 27 on the inside thereof. A pair of reaction claws 29 are also formed on the inside of caliper limb $7_2$ along the outer periphery of recess 28 in symmetrical relation to each other. The inner diameter $D_1$ of notch 27 is smaller than the outer diameter $D_2$ of piston 15 and the outer diameter $D_3$ of semicircular recess 28 is larger than $D_2$. As shown in FIG. 2, the distance $L_1$ between the bottom surface $28_a$ of recess 28 and the inside surface $7_{1a}$ of first caliper limb $7_1$ is larger than the axial length $L_2$ of piston 15. Further, the distance $L_3$ between the inside surface $7_{1a}$ of the first limb $7_1$ and the pad-engaging faces 30 of reaction claws 29 on the second limb $7_2$ is made equal to the total sum of thickness $T_1$ of the first brake pad $P_1$, unworn and including backing plate $9_1$ and shim 16, thickness $T_2$ of the second brake pad $P_2$, unworn and including backing plate $9_2$, thickness $T_3$ of the rotary disc D when unworn, optimum clearance $C_1$ between the first pad $P_1$ and the inside surface $7_{1a}$ of first limb $7_1$, and optimum clearances $C_2$ between the brake disc D and the brake pads $P_1$ and $P_2$. The axial length $L_2$ of piston 15 is determined at a value larger than the distance $L_3$ to enable stable sliding movement of the piston within the hydraulic cylinder 14.

Accordingly, in assembling the piston 15 into the cylinder 14 defined in the first caliper limb $7_1$, the piston 15 can be slidingly fitted into the space between the inside surface $7_{1a}$ of first limb $7_1$ and the semicircularly recessed surface 28 on the inside of second limb $7_2$ from beneath, as viewed in FIG. 2, and then shifted endwise so as to be accommodated in the cylinder 14. In this manner, the piston 15 can be mounted efficiently with extreme ease without being obstructed by the reaction claws 29 formed on the inside of the second caliper limb $7_2$.

Referring to FIGS. 2, 3 and 5, reference numeral 18 indicates a pad presser spring fitted in a cavity 17 formed in the bottom of the roof of bridging section of brake caliper C and which spring has a pressing ridge 18a formed medially on the underside thereof and resiliently engageable with positioning grooves 19 formed in the top edges of respective backing plates $9_1$ and $9_2$ medialy thereof to hold the backing plates $9_1$, $9_2$ in place pressed against the hanger pins 8 so that any inadvertent movement of the brake pads $P_1$ and $P_2$ is effectively prevented.

Description will next be made of the operation of the embodiment described above. When, upon operation of the brake pedal, pressure oil is fed from a master cylinder, not shown, to the oil-hydraulic cylinder 14 through the oil inlet port 13, the piston 15 advancing under the oil pressure is pressed against the back surface of first brake pad $P_1$, causing the latter to slide over the hanger pins 8 into pressure engagement with the adjacent face of brake disc D and, by reaction, the brake caliper C is moved in a direction opposite to that in which piston 15 has been advanced, sliding over the first and second slide pins $2_1$ and $2_2$, which are slidably fitted through support holes $4_1$ and $4_2$ formed in the respective lugs $3_1$ and $3_2$ on the brake caliper C. As a consequence, the second caliper limb $7_2$, acting upon the back surface of second brake pad $P_2$, causes the latter to make pressure contact with the adjacent face of brake disc D. In this manner, the brake disc D rotating in the direction indicated by the arrow R, is effectively braked on the opposite faces thereof.

During the braking operation, the braking torque reaction transmitted from the rotating disc D to the brake pads $P_1$ and $P_2$ is borne or absorbed by the torque-bearing surface 11 of bracket B. This may possibly result in some bending of the bracket B but there arises practically no change in center distance of the first and second slide pins $2_1$ and $2_2$ secured to the bracket B, since the two pins are substantially aligned with each other radially of the brake disc D, as described hereinbefore. Thus, any influences of the braking torque on the brake caliper C and slide pins $2_1$, $2_2$ are extremely limited and the caliper C is at all times smoothly slidable in reaction to the braking stroke of piston 15 to ensure that the pressure forces of the two brake pads $P_1$ and $P_2$ acting on the opposite faces of brake disc D are well balanced and a braking operation is at all times guaranteed which is highly effective.

For replacing any worn-out brake pads $P_1$, $P_2$ by fresh ones, first the threaded bolt 5 is removed and the second slide pin $2_2$ is separated from the bracket B. Then, the brake caliper C is swung radially outwardly of the brake disc D about the axis of the first slide pin $2_1$, as indicated in FIG. 1 by the chain-dotted lines, so that an ample working space is provided on the open side of caliper C which is completely free of the bracket B and other parts such as a wheel axle, not shown. In this condition, the fastening screw 25 (FIG. 5) is backed off to release the retainer plate 22 and the latter is drawn up and away from the adjacent side of brake caliper C to disengage the detent lugs 22a from the hanger pins 8, which are now in alignment with the enlarged-diameter portion 24 of the locking apertures formed in the detent lugs 22a. Subsequently, the hanger pins 8 are withdrawn from the caliper C with their ends formed with projections 20 foremost and the brake pads $P_1$ and $P_2$ can now be readily removed from within the brake caliper C. As will be readily noted, substitute pads can be mounted by proceeding in just the reverse fashion to the procedure described above.

FIGS. 10 to 12 illustrate another example of retainer means for hanger pins 8, which includes a retainer clip 31 instead of the retainer plate 22 shown in FIGS. 5, 7 and 8.

The retainer clip 31 is formed of a resilient elongate material and, as seen in FIG. 11, is U-shaped, consisting of a pair of detent legs 31a and a bridging body portion 31b. The detent legs 31a are inserted into a pair of through apertures 33 formed in respective clip-receiving protrusions 32 on the outside of the second limb $7_2$ of brake caliper C to engage in the circumferential grooves 21 in the adjacent end portions of hanger pins 8 which extend through the protrusions 32. In the state of retainer clip 31 finally fitted, as shown, the detent legs 31a are held in a state slightly spread out or deflected away from each other while the bridge portion 31b interconnecting the legs 31a, which is arcuately shaped, is substantially in a freed state, as seen in FIG. 10.

To apply the retainer clip 31 to the hanger pins 8, first its detent legs 31a are slightly spread out and inserted into the through apertures 33 formed in the caliper limb $7_2$ until the bridge portion 31b of the clip comes into contact with tapered clip-guide surfaces 34 formed on the adjacent side of the second caliper limb $7_2$. Then, the bridge portion 31b is pushed down to bend outwardly as if slide down along the guide surfaces 34, causing the detent legs 31a to advance gradually into the respective circumferential grooves 21 formed in hanger pins 8 tangentially thereof. Finally, as the bridge portion 31b slides over the edges of guide surfaces 34, it is released therefrom and, restoring its normal shape, comes into abutting engagement with a stop surface 35 formed beneath the guide surface 34 and now the hanger pins 8 are both securely held in place by the clip 31. As will be apparent, the detent legs 31a of the clip 31 applied are held spread out in pressure engagement with the walls of the respective through apertures 33 against their own resiliency so as to be securely held therein.

As will be readily understood, the retainer clip 31 can be removed simply by drawing the bridge portion 31b laterally out of engagement with the stop surface 35 and then moving it upwardly thereby to disengage the detent legs 31a from the respective circumferential grooves 21 in hanger pins 8.

Figure 13:
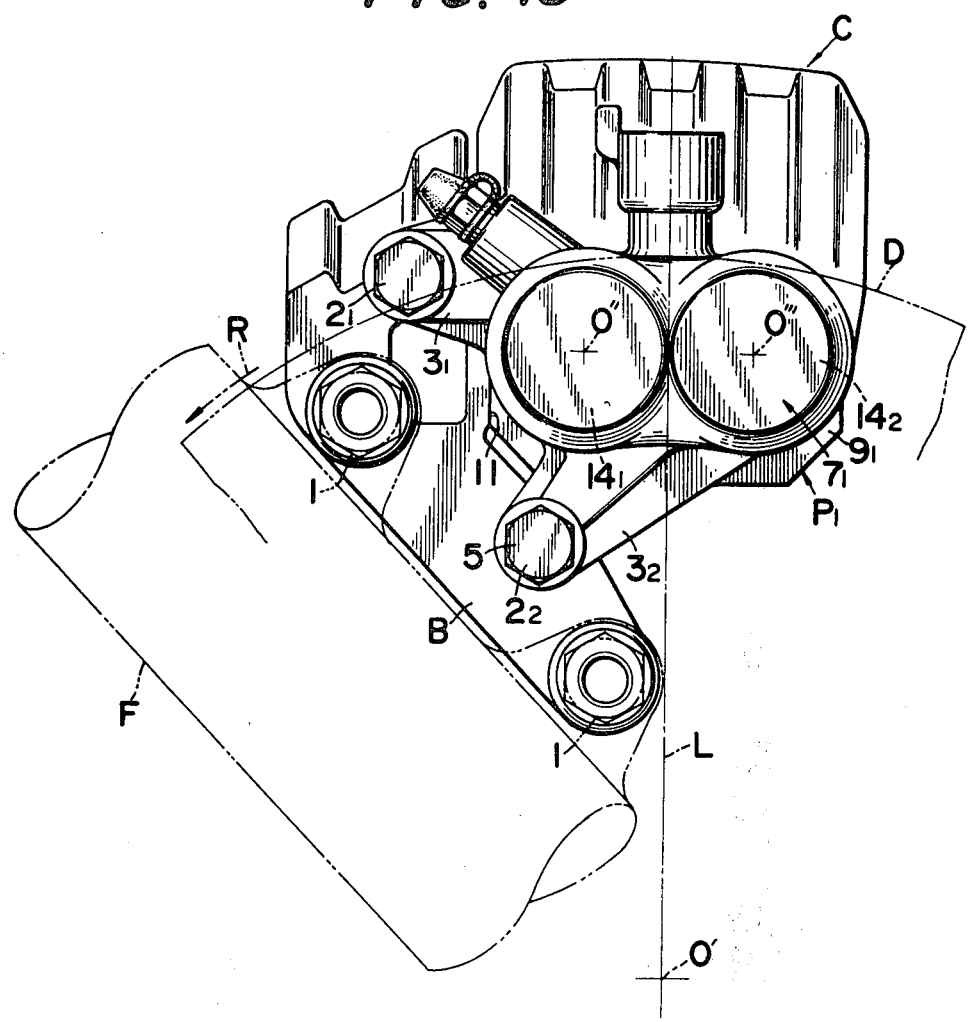
FIG. 13 is a side view of a third preferred form of disc brake assembly embodying the present invention.

Though in the embodiments shown and described hereinbefore, brake pressure application to the first brake pad $P_1$ is effected by a simple hydraulic assembly that includes a cylinder 14 defined in the first caliper limb $7_1$ and a piston 15 slidably fitted in the cylinder, it will be readily understood that the same purpose can also be served by any of hydraulic arrangements which include two or more piston members. For example, use can be made of a dual type hydraulic assembly which includes a pair of parallel hydraulic cylinders $14_1$, $14_2$ and two respective pistons slidably fitted therein, as illustrated in FIG. 13. In this case, it is to be noted that the first and second slide pins $2_1$ and $2_2$ are located on that side of the brake caliper C on which it is secured to a vehicle part and specifically on the forward side of the median plane L of the dual cylinder assembly $14_1$–$14_2$ with respect to the direction of rotation of the brake disc D. As shown, the median plane L, from which the central axes $O''$ and $O'''$ of respective hydraulic cylinders $14_1$, $14_2$ are equidistant, contains the axis of rotation, $O'$, of the brake disc D.

Features of the disc brake assembly of the present invention are summarized as follows: First, it has a bracket arranged wholly on the forward side of the brake caliper with respect to the direction of rotation of the brake disc, that is, on that side of the brake caliper on which the rotative brake disc leaves the caliper behind, and a pair of slide pins mounted on the bracket at locations substantially aligned with each other radially of the brake disc and on which pins the brake caliper is slidably mounted. A pair of brake pads are hung on the brake caliper by means of a pair of hanger pins so as to be brought into abutting engagement with a torque-bearing surface formed on the bracket only along the forward side edges of the brake pads with respect to the direction of rotation of the brake disc. Such arrangement of parts not only enables the bracket to take a substantially rectilinear and hence simplified form reduced in size but also enables the center distance between the two slide pins to remain unchanged, even if the bracket is strained under the braking torque, so that no substantial lateral pressure is exerted on either of the slide pins. Owing to this, the brake caliper is held at all times smoothly slidable along the slide pins and any unilateral wear of the brake pads and creaking thereof are effectively prevented without the need for use of a bracket of particularly thick section. It will be appreciated, therefore, that, according to the present invention, there is provided a disc brake assembly which is particularly compact in size, lightweight and reliable in operation.

According further to the present invention, the brake pads are removably mounted on the brake caliper and the slide pins, on which the latter is slidably mounted, are arranged on the bracket at locations spaced from each other radially of the brake disc, the radially inner one of the slide pins being removable from the bracket, so that not only the bracket can take a generally rectilinear simplified form but also an ample working space is obtainable for exchange of the brake pads by removing the radially inner slide pin and slightly swinging the brake caliper radially outwardly of the brake disc about the axis of the radially outer slide pin. This means that the brake pads can be easily replaced by fresh ones whenever required without being obstructed by any neighboring members such as the bracket even where the space available for swinging movement of the brake caliper is rather limited.

What is claimed is:

1. A disc brake assembly for use in a vehicle having a fixed part, said assembly comprising a brake disc, having an axis of rotation, a piston adjacent to the brake disc, a bracket fixed to the fixed part of the vehicle in the piston adjacent to the brake disc, a first and a second brake pad arranged on opposite sides of the brake disc, a brake caliper having a first and a second limb formed to straddle the brake pads and including in the first limb pressure means for exerting pressure on the back of the first brake pad, first and second slide pins on the bracket to connect the brake caliper therewith while allowing the brake caliper to slide in a direction parallel to the axis of rotation of the brake disc, the bracket being arranged wholly on the forward side of the brake caliper with respect to the direction of rotation of the brake disc, the first and second slide pins being substantially aligned with each other radially of the brake disc, and hanger pin means, the first and second brake pads being hung on the brake caliper by said hanger pin means so as to be held in abutting engagement with a torque-bearing surface formed on the bracket only along the forward side edges of the respective brake pads with respect to the direction of rotation of the brake disc.

2. A disc brake assembly as set forth in claim 1, in which the first and second brake pads are removably hung on the brake caliper and in which the second slide pin is spaced apart from the first slide pin radially inwardly of the brake disc and removably secured to the bracket whereby upon removal of the second slide pin the brake caliper is swingable radially outwardly of the brake disc about the axis of the first slide pin.

3. A disc brake assembly as set forth in claim 1 or 2, in which said hanger pin means includes a pair of hanger pins axially removably fitted through both the first and second limbs of the brake caliper to axially slidably support the two brake pads between the caliper limbs and each formed at one end with a circumferential groove around the periphery thereof and a detent member arranged to engage in the circumferential grooves in the hanger pins to hold the latter in place on the brake caliper.

4. A disc brake assembly as set forth in claim 3, comprising screw means and in which said detent member is a retainer plate secured to the brake caliper by said screw means and formed with a pair of elongate slots for fitting engagement with the circumferential grooves in the hanger pins and a pair of circular apertures communicating with the respective elongate slots at one end thereof and each having a diameter large enough to allow passage therethrough of the respective hanger pin.

5. A disc brake assembly as set forth in claim 3, in which said detent member is a clip of resilient material shaped so as to be adapted for insertion into through apertures formed in one of the two limbs of the brake caliper to engage in the circumferential grooves in the respective hanger pins as fitted through the caliper limb.

6. A disc brake assembly as set forth in claim 4, in which said hanger pins are each formed at the other end thereof with a positioning projection extending radially outwardly beyond the periphery of the hanger pin for abutting engagement with the adjacent outside surface of the first limb of the brake caliper when the hanger pin is fully inserted therein.

7. A disc brake assembly as set forth in claim 1 or 2, in which said pressure means includes a hydraulic fluid cylinder formed in the first limb of the brake caliper and a piston slidably fitted in the cylinder.

8. A disc brake assembly as set forth in claim 7, in which the distance between the opposing inside surfaces of the first and second limbs of the brake caliper is smaller than the axial length of the piston and the second caliper limb is formed in the inside surface thereof with a recess having a width larger than the diameter of the piston and a bottom surface spaced from the inside surface of the first caliper limb by a distance larger than the axial length of the piston.

9. A disc brake assembly as set forth in claim 1, in which the first and second slide pins are arranged on that side of a plane containing the central axis of said pressure means and the axis of rotation of the brake disc in which the brake caliper is fixed to said fixed part of the vehicle.

10. A disc brake assembly as set forth in claim 9, in which said pressure means consists of a hydraulic fluid cylinder formed in the first limb of the brake caliper and a piston slidably fitted in the cylinder, the central axis of said pressure means being defined as that of the cylinder.

11. A disc brake assembly as set forth in claim 9, in which said pressure means consists of a plurality of hydraulic fluid cylinders formed in the first limb of the brake caliper and a corresponding number of pistons slidably fitted in the respective cylinders, the central axis of said pressure means being defined as the axis of symmetry of the whole plural-cylinder structure.

12. A disc brake assembly as set forth in claim 5 in which said hanger pins are each formed at the other end thereof with a positioning projection extending radially outwardly beyond the periphery of the hanger pin for abutting engagement with the adjacent outside surface of the first limb of the brake caliper when the hanger pin is fully inserted therein.

* * * * *